United States Patent
Jang et al.

(10) Patent No.: US 10,313,890 B2
(45) Date of Patent: Jun. 4, 2019

(54) METHOD AND DEVICE FOR RECEIVING SERVICE THROUGH DIFFERENT WIRELESS COMMUNICATION SYSTEMS

(71) Applicant: Samsung Electronics Co., Ltd., Suwon-si, Gyeonggi-do (KR)

(72) Inventors: Jaehyuk Jang, Suwon-si (KR); Donggun Kim, Seoul (KR); Sangbum Kim, Suwon-si (KR); Soenghun Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 15/487,922

(22) Filed: Apr. 14, 2017

(65) Prior Publication Data

US 2017/0311170 A1 Oct. 26, 2017

(30) Foreign Application Priority Data

Apr. 20, 2016 (KR) .................. 10-2016-0048265

(51) Int. Cl.
*H04W 16/14* (2009.01)
*H04W 8/22* (2009.01)
(Continued)

(52) U.S. Cl.
CPC ............. *H04W 16/14* (2013.01); *H04W 8/22* (2013.01); *H04W 24/10* (2013.01); *H04W 48/16* (2013.01); *H04W 84/12* (2013.01); *H04W 88/06* (2013.01)

(58) Field of Classification Search
None
See application file for complete search history.

(56) References Cited

U.S. PATENT DOCUMENTS

| 6,940,844 B2 | 9/2005 | Purkayastha et al. |
| 8,913,538 B2 | 12/2014 | Lee et al. |

(Continued)

FOREIGN PATENT DOCUMENTS

| KR | 10-2005-0037396 A | 4/2005 |
| KR | 10-2016-0065740 A | 6/2016 |

(Continued)

OTHER PUBLICATIONS

3GPP, TSG SA, Study on Wireless Local Area Network (WLAN) network selection for 3GPP terminals, Stage 2 (Release 12), 3GPP TR 23.865 V12.1.0, Dec. 17, 2013, See section 6.11, Valbonne, France.

(Continued)

*Primary Examiner* — Christine T Duong
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

A method for a terminal to receive a service through different wireless communication systems is provided. The method includes identifying whether a request for use of a second wireless communication system that uses a second band is sensed with respect to the terminal that performs communications with a base station of a first wireless communication system through a first band and the second band, when the request for use of the second wireless (Continued)

communication system is sensed, transmitting a message including information indicating a change of user equipment (UE) capability information, and reporting the changed UE capability information based on the message.

20 Claims, 12 Drawing Sheets

(51) Int. Cl.
  *H04W 24/10* (2009.01)
  *H04W 48/16* (2009.01)
  *H04W 84/12* (2009.01)
  *H04W 88/06* (2009.01)

(56) References Cited

U.S. PATENT DOCUMENTS

| | | |
|---|---|---|
| 8,913,583 B2 | 12/2014 | Lee et al. |
| 2011/0267955 A1 | 11/2011 | Dalsgaard |
| 2016/0192283 A1 | 6/2016 | Kwak et al. |
| 2016/0269160 A1 | 9/2016 | Noh et al. |
| 2017/0238188 A1* | 8/2017 | Youtz ............... H04W 16/14 455/454 |
| 2017/0280330 A1* | 9/2017 | Martin ............... H04W 16/14 |

FOREIGN PATENT DOCUMENTS

| | | |
|---|---|---|
| WO | 2015/037940 A1 | 3/2015 |
| WO | 2016/045909 A1 | 3/2016 |

OTHER PUBLICATIONS

Samsung, Extending the IDC framework for LAA, 3GPP TSG-RAN2 Meeting #91bis, R2-154370, Malmo, Sweden, Oct. 4, 2015.
Samsung, UE behaviours of different UE and Network conditions in LTE-WLAN integrated Network Environment, 3GPP TSG-RAN WG2 Meeting #91, R2-153150, Beijing, China, Aug. 23, 2015.
Extended European Search Report dated Mar. 28, 2019, issued in the European patent application No. 17786167.1.

* cited by examiner

METHOD AND DEVICE FOR RECEIVING SERVICE THROUGH DIFFERENT WIRELESS COMMUNICATION SYSTEMS

CROSS-REFERENCE TO RELATED APPLICATION(S)

This application claims the benefit under 35 U.S.C. § 119(a) of a Korean patent application filed on Apr. 20, 2016 in the Korean Intellectual Property Office and assigned Serial number 10-2016-0048265, the entire disclosure of which is hereby incorporated by reference.

TECHNICAL FIELD

The present disclosure relates to a wireless communication system. More particularly, the present disclosure relates to a method and a device for receiving a service through different wireless communication systems.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, wireless communication technology has been suddenly developed, and thus communication system technology has repeatedly evolved. Among them, a system that has currently been highlighted as 4th generation (4G) mobile communication technology is a long term evolution (LTE) system. In the LTE system, in order to satisfy the traffic command that is suddenly increasing, various technologies have been introduced, and one of such technologies is carrier aggregation (CA). In the related art, only one carrier is used to perform communications between a terminal (user equipment (UE), hereinafter referred to as a "terminal") and a base station (E-UTRAN NodeB or eNB, hereinafter referred to as a "base station"). The CA technology is a technology that additionally uses a primary carrier and one or more secondary carriers, and thus can greatly increase throughput based on the number of secondary carriers being added.

In the LTE system, a cell in a base station that uses a primary carrier is called a primary cell (PCell), and a cell in a base station that uses a secondary cell is called a secondary cell (SCell). Only one PCell exists, and 4 SCells (based on LTE Release 11) can exist at maximum. However, the number of SCells can be further increased in the future.

The LTE system may be a system that performs communications using a licensed band frequency that a communication service provider is allocated with from the Government. Recently, in order to satisfy the traffic demand that is suddenly increasing, technology for using LTE technology in an unlicensed band that is currently used by wireless local area network (LAN) or Bluetooth (BT) has been defined, and such usage of the LTE technology in the unlicensed band is called licensed assisted access (LAA) technology. In the case of grafting the CA technology on the LAA technology, a scenario in which the PCell uses a licensed band frequency and the SCell uses an unlicensed band frequency through the LAA technology may be considered. The SCell that uses the unlicensed band as described above may be called an unlicensed SCell (U-SCell).

On the other hand, the latest terminal, such as a smart phone, may perform communications using a different wireless communication system (e.g., wireless LAN technology) that uses the unlicensed band in addition to an LAA wireless communication system that uses the LAA technology. For example, a user may receive a service through the unlicensed band through an access of a private wireless LAN access point (AP) at home. However, if a cell that uses the unlicensed band has been set to use a secondary carrier in a terminal, or a base station instructs the terminal to set the cell that uses the unlicensed band to use the secondary carrier in the case where the user of the terminal intends to access the private AP at home, the terminal is unable to perform communications simultaneously using the LAA wireless communication system and the different wireless communication system that uses the unlicensed band in the same unlicensed band or an adjacent unlicensed band.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a device that can enable a terminal to commonly use a licensed-assisted access (LAA) wireless communication system and a different wireless communication system using an unlicensed band.

In accordance with an aspect of the present disclosure, a method for a terminal to receive a service through different wireless communication systems is provided. The method includes identifying whether a request for use of a second wireless communication system that uses a second band is sensed with respect to the terminal that performs communications with a base station of a first wireless communication system through a first band and the second band, when the request for use of the second wireless communication system is sensed, transmitting a message including information indicating a change of user equipment (UE) capability information, and reporting the changed UE capability information based on the message.

In accordance with another aspect of the present disclosure, a method for a base station of a first wireless communication system to provide a service to a terminal is provided. The method includes, when a request for use of a second wireless communication system that uses a second band is sensed from the terminal, receiving a message that includes information indicating a change of user equipment (UE) capability information, transmitting a UE capability information request message based on the message, and receiving the changed UE capability information.

In accordance with another aspect of the present disclosure, a terminal that receives a service through different wireless communication systems is provided. The terminal includes a transceiver configured to perform communications with different network entities, and at least one processor configured to identify whether a request for use of a second wireless communication system that uses a second band is sensed with respect to the terminal that performs communications with a base station of a first wireless communication system through a first band and the second band, when the request for use of the second wireless communication system is sensed, control the transceiver to transmit a message including information indicating a change of user equipment (UE) capability information, and control the transceiver to report the changed UE capability information based on the message.

In accordance with another aspect of the present disclosure, a base station of a first wireless communication system that provides a service to a terminal is provided. The base station includes a transceiver configured to perform communications with different network entities, and at least one processor configured to, when a request for use of a second wireless communication system that uses a second band is sensed from the terminal, control the transceiver to receive a message that includes information for indicating a change of user equipment (UE) capability information, control the transceiver to transmit a UE capability information request message based on the message, and control the transceiver to receive the changed UE capability information.

According to the present disclosure, the terminal can commonly use the LAA wireless communication system and the different wireless communication system that uses the unlicensed band in the unlicensed band, and can receive the service using the different wireless communication systems.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
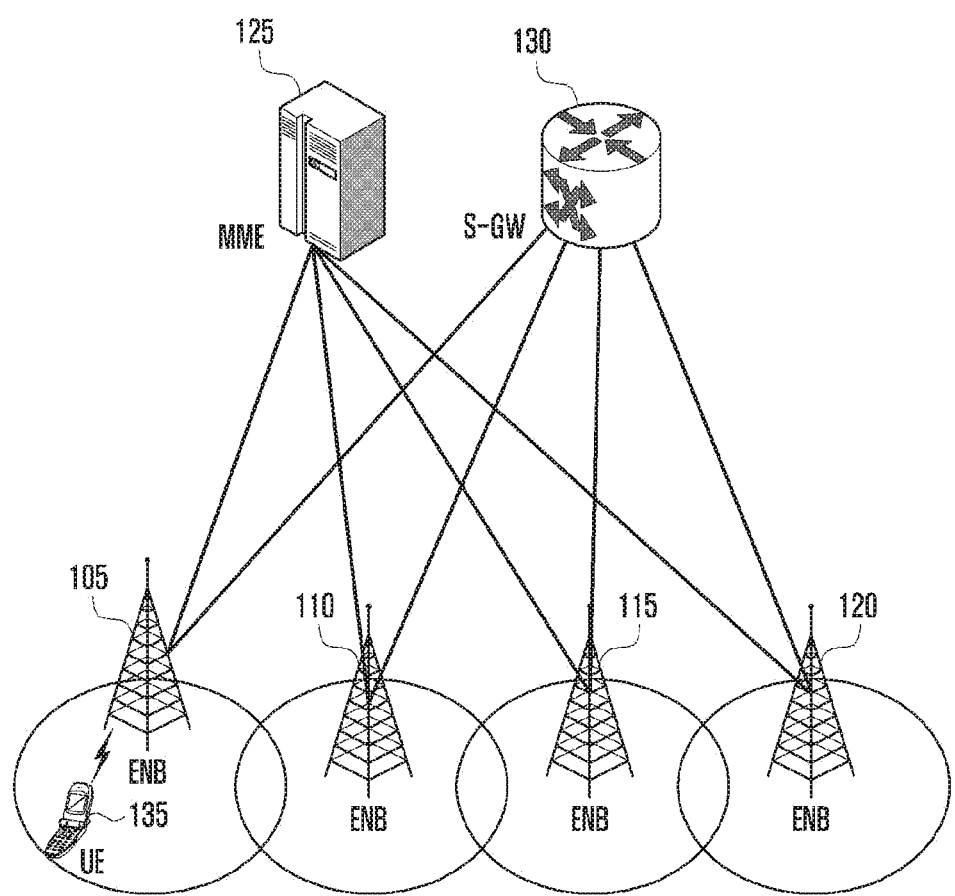
FIG. 1 is a diagram illustrating the structure of a long term evolution LTE) system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, preferred embodiments of the present disclosure will be described in detail with reference to the accompanying drawings.

In explaining embodiments of the present disclosure, explanation of technical contents which are well known in the art to which the present disclosure pertains and are not directly related to the present disclosure will be omitted. This is to transfer the subject matter of the present disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the present disclosure and methods for achieving the aspects and features will be apparent by referring to the embodiments to be described in detail with reference to the accompanying drawings. However, the present disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the present disclosure is only defined within the scope of the appended claims. In the entire description of the present disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit," as used in an embodiment, means, but is not limited to, a software or hardware component, such as field-programmable gate array (FPGA) or application-specific integrated circuit (ASIC), which performs certain tasks. However, a unit does not mean to be limited to software or hardware. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Further, the components and units may be implemented to operate one or more central processing unit (CPUs) in a device or a security multimedia card.

FIG. 1 is a diagram illustrating the structure of a long term evolution (LTE) system according to an embodiment of the present disclosure.

Referring to FIG. 1, a radio access network of an LTE system is composed of evolved node B (RAN node, ENB, Node B, or base station) 105, 110, 115, and 120, a mobility management entity (MME) 125 that is called a core network node, and a serving-gateway (S-GW) 130. A user equipment (UE or terminal) 135 is connected to an external network through the ENB 105, 110, 115, and 120 and the S-GW 130.

Referring to FIG. 1, the ENB 105, 110, 115, and 120 corresponds to the existing Node B of a universal mobile telecommunication system (UMTS). The ENB is connected to the UE 135 through a radio channel, and performs a more complicated role than the role of the existing Node B. Since all user traffic including a real-time service, such as a voice over Internet protocol (VoIP) through the Internet protocol, are serviced through a shared channel, a device that performs scheduling through gathering of status information, such as a buffer status of the UE, an available transmission power status, and a channel status, is needed, and the ENB 105, 110, 115, and 120 takes charge of this. That is, the ENB may support a connection between the UE and a core network (CN) through gathering of the status information, such as the buffer status of the UE, available transmission power status, and channel status in order to service user traffics. Typically, one ENB controls a plurality of cells.

For example, in order to implement a transmission speed of 100 Mbps, the LTE system uses orthogonal frequency division multiplexing (OFDM) in the bandwidth of 20 MHz as a radio connection technology. Further, the LTE system uses adaptive modulation and coding (AMC) that determines a modulation scheme and a channel coding rate to match the channel status of the UE. The S-GW 130 is a device that provides a data bearer, and generates or removes the data bearer in accordance with the control of the MME 125.

The MME 125 is a device that takes charge of not only mobility management of the UE but also various kinds of control functions, and is connected to a plurality of ENBs. Specifically, in order to manage the mobility of the UE, the ENB and the MME may be connected to each other, and the connection between the MME and the ENB may be called an S1 connection. The MME is the pivot that manages the mobility of the UE, and performs a role of relaying the connection between the ENB and the S-GW/packet data network (PDN) gateway (P-GW). A control signal of the UE is transmitted to the MME through the ENB. If needed, the MME processes the control signal through negotiations with the S-GW/P-GW. A data signal of the UE is transmitted to the S-GW/P-GW through the ENB.

Further, the MME 125 and the S-GW 130 may further perform authentication of the UE that is connected to a network and bearer management, and may process a packet that is received from the ENB or a packet to be transferred to the ENB.

Figure 2:
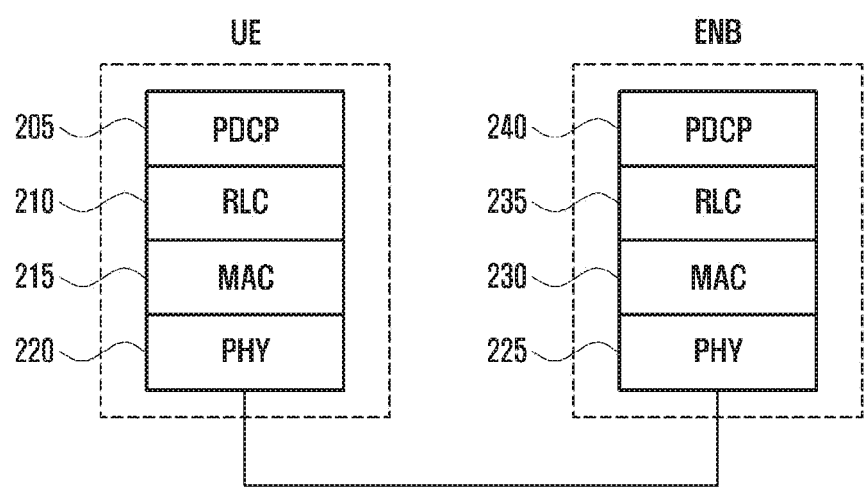
FIG. 2 is a diagram illustrating a wireless protocol structure in an LTE system according to an embodiment of the present disclosure.

FIG. 2 is a diagram illustrating a radio protocol structure in an LTE system according to an embodiment of the present disclosure.

Referring to FIG. 2, a radio protocol of an LTE system is composed of a packet data convergence protocol (PDCP) 205 or 240, a radio link control (RLC) 210 or 235, a medium access control (MAC) 215 or 230, and a physical layer (PHY) 220 or 225 in each of the UE and the ENB.

The PDCP 205 or 240 takes charge of IP header compression/decompression operations.

The RLC 210 or 235 reconfigures a PDCP packet data unit (PDU) that is received from the PDCP layer with an appropriate size, and performs an automatic repeat request (ARQ) operation.

The MAC 215 or 230 is connected to various RLC layer devices that are configured in one UE, and performs multiplexing of RLC PDUs to the MAC PDU and demultiplexing of the RLC PDUs from the MAC PDU.

The PHY 220 or 225 performs channel coding and modulation of upper layer data and produces an OFDM symbol to transmit the OFDM symbol through the radio channel, or performs demodulation and channel decoding of the OFDM symbol that is received through the radio channel to transfer the demodulated and decoded OFDM symbol to an upper layer. Further, the PHY uses hybrid ARQ (HARQ) for additional error correction, and a receiving end transmits whether to receive the packet that is transmitted from a transmitting end with one bit. This is called HARQ acknowledge (ACK)/negative acknowledge (NACK) information.

Downlink HARQ ACK/NACK information against uplink transmission may be transmitted through a physical hybrid-ARQ indicator channel (PHICH), and uplink HARQ ACK/NACK information against downlink transmission may be transmitted through a physical uplink control channel (PUCCH) or a physical uplink shared channel (PUSCH) physical channel.

Although not illustrated in the drawing, a radio resource control (RRC) layer may exist in an upper position of the packet data channel (PDCH) layer of the UE or the ENB, and may send and receive connection and measurement related setup control messages for the RRC.

Figure 3:
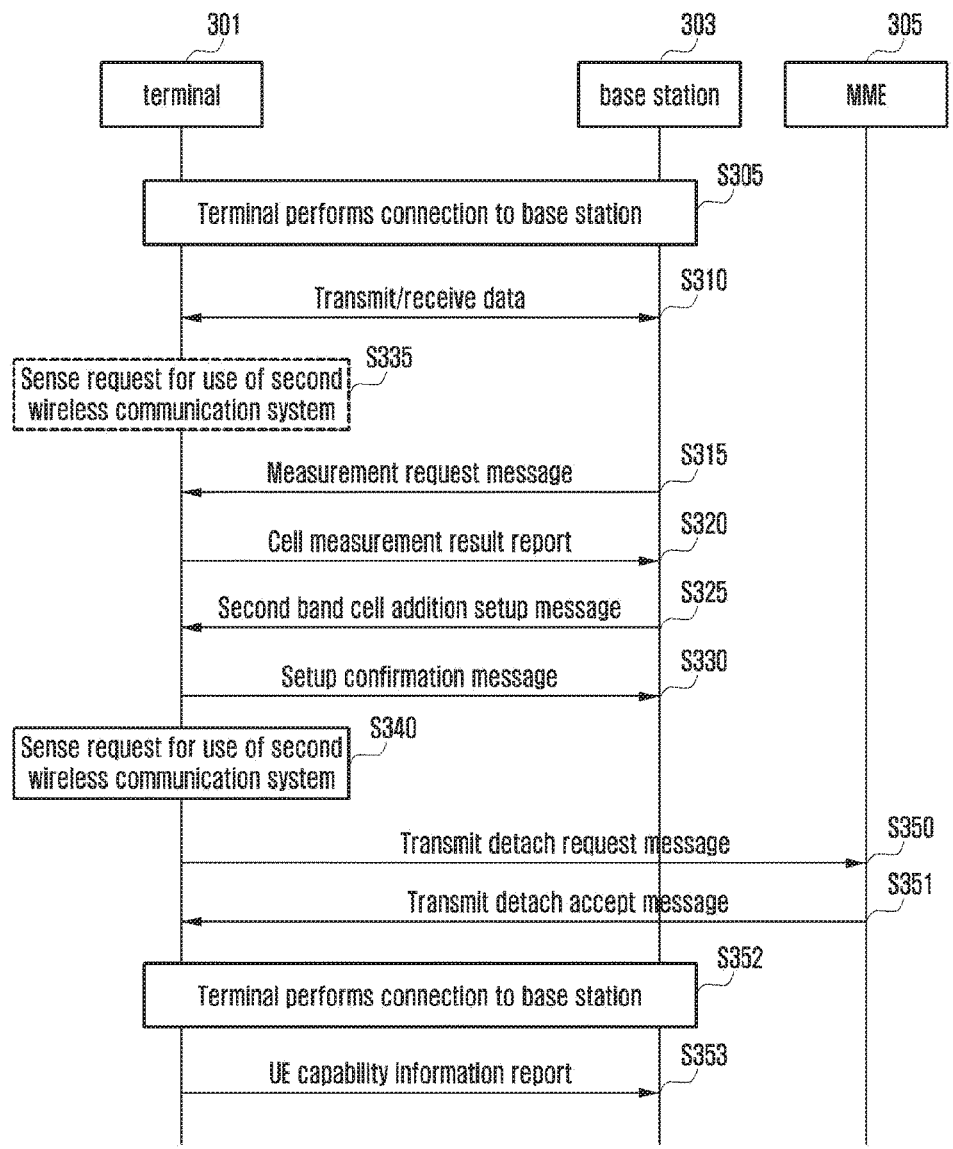
FIG. 3 is a diagram illustrating a method for receiving a service through different wireless communication systems according to an embodiment of the present disclosure.

FIG. 3 is a diagram illustrating a method for receiving a service through different wireless communication systems according to an embodiment of the present disclosure.

In the present disclosure, a licensed band may be called a first band, and an unlicensed band may be called a second band. Further, a system (e.g., licensed-assisted access (LAA) system or LTE system) that performs communications using the licensed band and the unlicensed band may be called a first wireless communication system, and a system (e.g., wireless local area network (WLAN) system) that performs communications using the unlicensed band may be called a second wireless communication system. In the present disclosure, for convenience in explanation, it is exemplified that the first wireless communication system is an LAA system, and the second wireless communication system is a Wireless LAN system. However, the scope of the present disclosure is not limited thereto.

Referring to FIG. 3, at operation S305, a terminal 301 may perform a connection to a base station 303.

At operation S310, the terminal that is connected to the base station may transmit/receive data to/from the base station in the first band. As described above, a state where the terminal is connected to the base station to transmit/receive data to/from the base station may be called an RRC connected (or RRC_CONNECTED) mode. In contrast, a state where the terminal is not connected to a specific base station, but is in an idle mode may be called an RRC idle (or RRC_IDLE) mode.

On the other hand, although not illustrated in the drawing, the terminal may report information on functions supported by the terminal (hereinafter referred to as "UE capability information") to a network.

Specifically, if the terminal is initially connected to the base station (or network) (e.g., power-on of the terminal), the base station may transmit a UE capability enquiry message for requesting the UE capability information from the terminal during the connection process. The base station may receive an initial context setup request message from an MME 305, and if the UE capability information is not included in the received initial context setup request message, the base station may transmit the UE capability enquiry message to the terminal. The terminal may transmit the UE capability information to the base station in response to the UE capability enquiry message.

On the other hand, the UE capability information may be stored in the MME. Accordingly, if the connection between the base station and the terminal is cut off and reconnection is performed after the initial connection of the terminal, the base station may receive the UE capability information from the MME, and the terminal may not report the UE capability information again. However, if the terminal is detached from the network, the MME may delete the UE capability information, and if the terminal is reattached to the network, the base station may request the UE capability information from the terminal again. Further, if the terminal performs handover, a target base station may receive the UE capability information from a serving base station.

It is assumed that the terminal according to the present disclosure supports a function that can transmit/receive data through carrier aggregation (CA) which uses a cell that uses the first band as a primary carrier and uses a cell that uses the second band as a secondary carrier (hereinafter referred to as "LAA function"), and the base station confirms that the terminal supports the LAA function through the received UE capability information.

After the terminal performs the connection to the base station, at operation S315, the base station may transmit, to the terminal, a measurement request message that includes cell measurement setup information in order to set the terminal to perform cell measurement. In this case, the cell measurement setup information may include measurement setup information for the cell that uses the second band.

Accordingly, the terminal may perform cell measurement in accordance with the received measurement setup information, and the result of performing the cell measurement may include the measurement result of the cell that uses the second band.

If a report condition that is included in the measurement setup information is satisfied, at operation S320, the terminal that has performed the cell measurement may report the result of cell measurement to the base station. In this case, the report condition that is included in the measurement setup information may include, for example, a predetermined period or a case where the measurement result exceeds a predetermined value, and if the predetermined period arrives or the cell measurement result exceeds the predetermined value, the terminal may report the cell measurement result to the base station.

The base station that has received the cell measurement result may determine whether the cell of the second band can be added to the terminal. That is, the base station can determine whether the CA that uses a cell of an unlicensed band as a secondary carrier is possible. In the present disclosure, the cell of the second band that is used as the secondary carrier may be called an unlicensed band cell or an LAA cell.

If it is determined that the addition of the second band cell is possible, the base station, at operation S325, may transmit a setup message for additionally setting the corresponding second band cell to the terminal. For example, in order to additionally configure the second band cell to the terminal, the base station may transmit an RRC connection reconfiguration message to the terminal.

At operation S330, the terminal that has received the setup message may transmit a confirmation message with respect to the setup message for additionally setting the second band cell. For example, the terminal may transmit an RRC connection reconfiguration complete message to the base station.

On the other hand, at operation S335 or S340, the terminal may identify whether a request for use of the second wireless communication system that uses the second band is sensed. The terminal may identify whether the request for use of the second wireless communication system is sensed even at the operation before the second band cell is additionally set to the terminal (e.g., operation S335). Further, the terminal may identify whether the request for use of the second wireless communication system is sensed at operation S340 after the second band cell is additionally configure to the terminal. However, at operation S335, the process of identifying whether the request for use of the second wireless communication system is sensed may be omitted. A case where the request for use of the second wireless communication system is sensed may be exemplified, as follows:

A case where power of the wireless LAN of the terminal is turned off;

A case where wireless LAN background scanning is performed (for positioning that is triggered from the operating system) even if the wireless LAN of the terminal is turned off; or A case where the terminal moves to an area in which usability of the wireless LAN is high, such as user's home or office, even if the wireless LAN of the terminal is turned off (location grasping using information, such as global positioning system (GPS), cell identifier (ID), and wireless LANID).

If the terminal senses the request for use of the second wireless communication system, in an embodiment, a method for the terminal to be completely detached from the network and then be reattached to the network to re-report UE capability information is proposed.

Specifically, at operation S350, the terminal may transmit a detaching request message for detaching the terminal from the network to the MME through the base station.

The MME that has received the detaching request message may perform detaching of the terminal from the network through transmission of a session delete request message through an S-GW.

If the terminal is detached from the network, that base station, at operation S351, may transmit a detaching accept message that means completion of the detaching from the terminal.

If the terminal is detached from the network, the terminal, at operation S352, may be reattached to the base station.

If the terminal is reattached to the base station, as described above, the base station may transmit a UE capability enquiry message to the terminal. At operation S353, the terminal that has been reattached to the base station may re-report the UE capability information to the base station in accordance with the request from the base station.

When reporting the UE capability information, the terminal may report that the terminal does not support an LAA function, although the terminal supports the LAA function, to cause the base station not to set an LAA related function. Accordingly, through the above-described procedure, the base station may determine that the terminal does not support the LAA function, and may not set the LAA function. Accordingly, the base station may not additionally set the second band cell, but may perform communications through the first band cell. In this case, the terminal may receive a bearer setup from the network, and may receive information that is related to what bearer the data is mapped on. Accordingly, newly generated data may be mapped on the bearer in accordance with the above-described information and may be transmitted or received through the first band cell.

Through the above-described method, the terminal may perform communications with the first wireless communication system through the first band, and may perform communications with the second wireless communication system through the second band in accordance with the request for use of the second wireless communication system.

Figure 4:
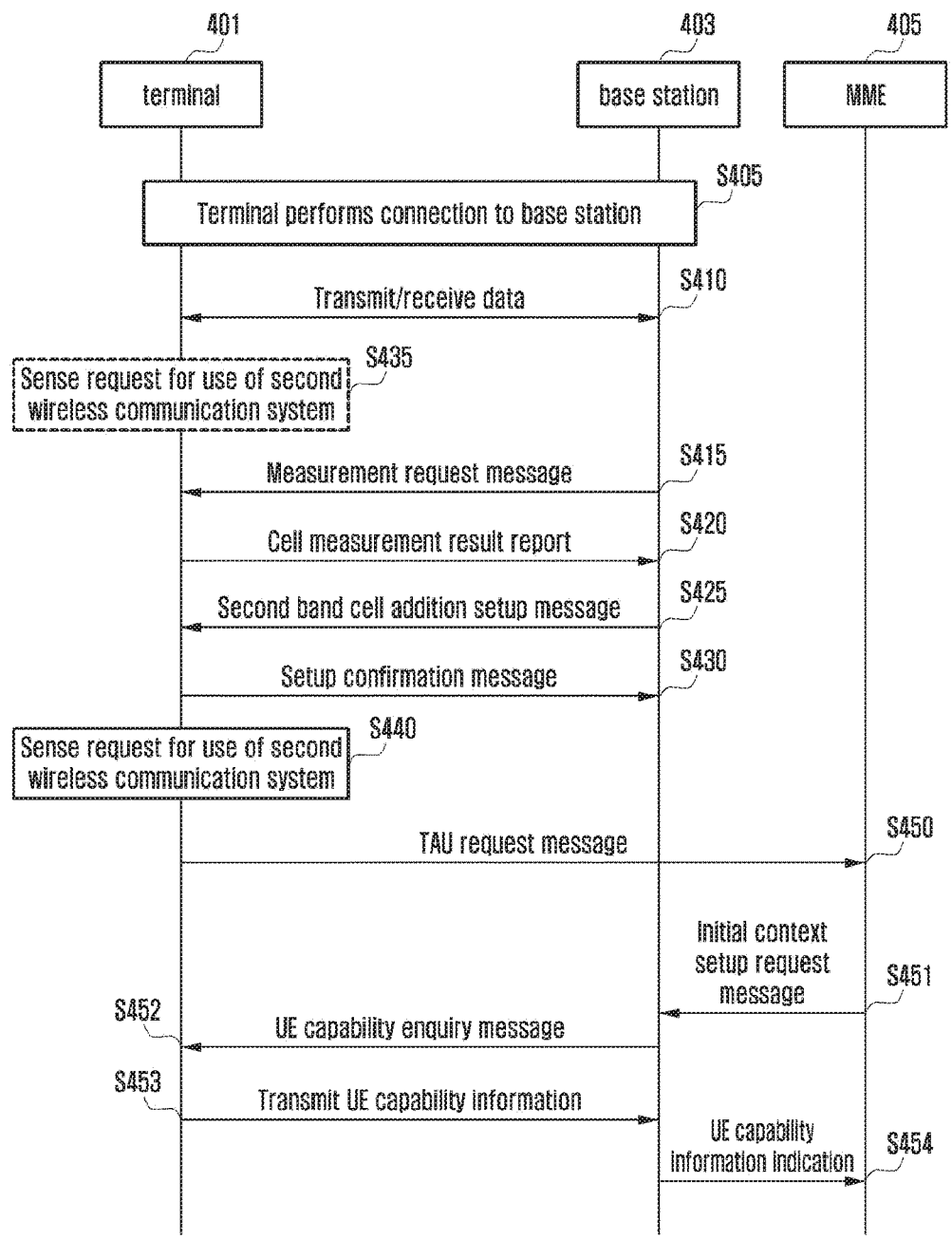
FIG. 4 is a diagram illustrating a method for receiving a service through different wireless communication systems according to an embodiment of the present disclosure.

FIG. 4 is a diagram illustrating a method for receiving a service through different wireless communication systems according to an embodiment of the present disclosure.

Referring to FIG. 4, at operation S405, a terminal 401 may perform a connection to a base station 403.

At operation S410, the terminal that is connected to the base station may transmit/receive data to/from the base station through the first band. As described above, a state where the terminal is connected to the base station to transmit/receive data to/from the base station may be called an RRC connected (or RRC_CONNECTED) mode. In contrast, a state where the terminal is not connected to a specific base station, but is in an idle mode, may be called an RRC idle (or RRC_IDLE) mode.

On the other hand, although not illustrated in the drawing, the terminal may report information on functions supported by the terminal to a network.

Specifically, after the terminal is connected to the base station, or while the terminal is connected to the base station, the base station may request UE capability information from the terminal. For example, the base station may transmit a UE capability enquiry message for requesting the UE capability information from the terminal if the UE capability information is needed for scheduling or the like.

The terminal may transmit the UE capability information to the base station in response to the UE capability enquiry message. It is assumed that the terminal according to the present disclosure supports an LAA function, and the base station confirms that the terminal supports the LAA function through the received UE capability information.

After the terminal performs the connection to the base station, at operation S415, the base station may transmit, to the terminal, a measurement request message that includes cell measurement setup information in order to set the terminal to perform cell measurement. In this case, the cell measurement setup information may include measurement setup information for the cell that uses the second band.

Accordingly, the terminal may perform cell measurement in accordance with the received measurement setup information, and the result of performing the cell measurement may include the measurement result of the cell that uses the second band.

If a report condition that is included in the measurement setup information is satisfied, at operation S420, the terminal that has performed the cell measurement may report the result of the cell measurement to the base station. In this case, the report condition that is included in the measurement setup information may include, for example, a predetermined period or a case where the measurement result exceeds a predetermined value, and if the predetermined period arrives or the cell measurement result exceeds the predetermined value, the terminal may report the cell measurement result to the base station.

The base station that has received the cell measurement result may determine whether the cell of the second band can be added to the terminal. That is, the base station can determine whether the CA that uses the cell of the second band as the secondary carrier is possible.

If it is determined that the addition of the second band cell is possible, the base station, at operation S425, may transmit a setup message for additionally setting the corresponding second band cell to the terminal. For example, in order to additionally set the second band cell to the terminal, the base station may transmit an RRC connection reconfiguration message to the terminal.

At operation S430, the terminal that has received the setup message may transmit a confirmation message with respect to the setup message for additionally setting the second band cell. For example, the terminal may transmit an RRC connection reconfiguration complete message to the base station.

On the other hand, at operation S435 or S440, the terminal may confirm whether a request for use of the second wireless communication system that uses the second band is sensed. The terminal may confirm whether the request for use of the second wireless communication system is sensed even at the operation before the second band cell is additionally set to the terminal (e.g., operation S435). Further, the terminal may confirm whether the request for use of the second wireless communication system is sensed at operation S440 after the second band cell is additionally set to the terminal. However, at operation S435, the process of confirming whether the request for use of the second wireless communication system is sensed may be omitted.

A case where the request for use of the second wireless communication system is sensed may be exemplified as follows:

A case where power of the wireless LAN of the terminal is turned off,

A case where wireless LAN background scanning is performed (for positioning that is triggered from the operating system) even if the wireless LAN of the terminal is turned off or A case where the terminal moves to an area in which usability of the wireless LAN is high, such as user's home or office, even if the wireless LAN of the terminal is turned off (location grasping using information, such as GPS, cell ID, and wireless LAN identifier).

If the terminal senses the request for use of the second wireless communication system, in an embodiment, instead of the method for the terminal to be detached from the network according to the above, a method for indicating that the UE capability information has been changed using the existing used message and for re-reporting the UE capability information that includes UE capability is proposed.

Specifically, at operation S450, the terminal may transmit a message that includes information indicating that the UE capability information has been changed to an MME 405 through the base station to inform the MME that the UE capability information has been changed. In this case, the terminal may include the information indicating that the UE capability information has been changed in a tracking area update (TAU) request message that means occurrence of a change of a tracking area to transmit the TAU request message to the MME. In the present disclosure, for convenience, the TAU request message is exemplified, but the scope of the present disclosure is not limited thereto. That is, the terminal may inform the MME that the UE capability information has been changed using a location area update (LAU) request message or a routing area update (RAU) request message.

Further, in the information indicating that the UE capability information has been changed, a field "UE radio capability information update needed," which is used when a function, such as global system for mobile communications (GSM)/code division multiple access (CDMA) 2000 of the terminal, is changed, may be used. That is, the terminal may include the field "UE radio capability information update needed" in the TAU request message to transmit the TAU request message to the MME.

The MME that has received the TAU request message can confirm that the UE capability information has been changed. Further, the MME, at operation S451, may transmit an initial context setup request message to the base station. In this case, the MME may cause the base station to re-receive the UE capability information through transmission of the initial context setup request message that does not include the UE capability information.

If the UE capability information is not included in the initial context setup request message, the base station, at operation S452, may transmit a UE capability information request message for requesting the UE capability information from the terminal.

At operation S453, the terminal that has received the UE capability information request message may transmit the UE capability information to the base station. Further, at operation S454, the base station that has received the UE capability information may transmit the received UE capability information to the MME.

On the other hand, at operation S453, when reporting the UE capability information, the terminal may report that the terminal does not support an LAA function, although the terminal supports the LAA function, to cause the base station not to set an LAA related function. Accordingly, the base station may determine that the terminal does not support the LAA function, and may not set the LAA function, but may detach the second band cell that has been set to the terminal. That is, the terminal and the base station may interrupt the communications with the first wireless communication system, which are performed through the second band. Accordingly, after the second band cell is detached, data may be transmitted or received through the first band cell.

Through the above-described method, the terminal may perform communications with the first wireless communication system through the first band, and may perform communications with the second wireless communication system through the second band in accordance with the request for use of the second wireless communication system.

Figure 5:
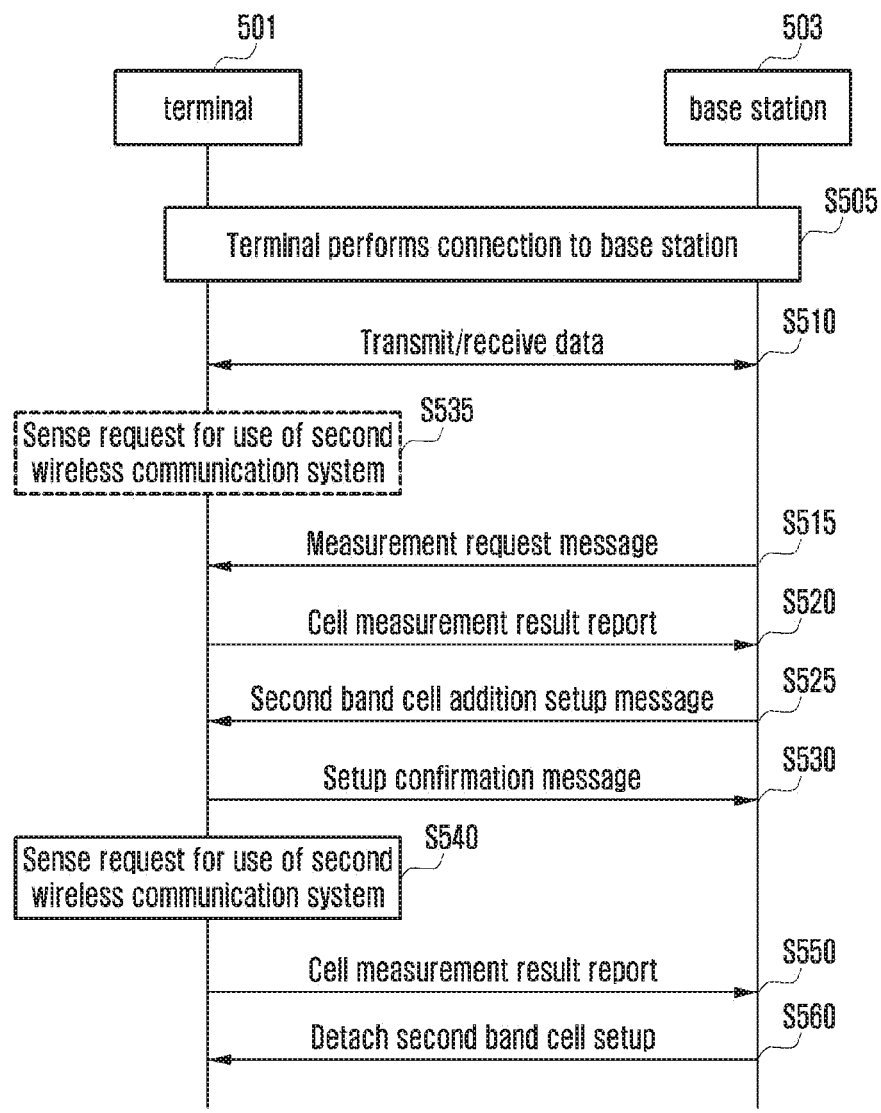
FIG. 5 is a diagram illustrating a method for receiving a service through different wireless communication systems according to an embodiment of the present disclosure.

FIG. 5 is a diagram illustrating a method for receiving a service through different wireless communication systems according to an embodiment of the present disclosure.

Referring to FIG. 5, at operation S505, a terminal 501 may perform a connection to a base station 503.

At operation S510, the terminal that is connected to the base station may transmit/receive data to/from the base station through the first band. As described above, a state where the terminal is connected to the base station to transmit/receive data to/from the base station may be called an RRC connected (or RRC_CONNECTED) mode. In contrast, a state where the terminal is not connected to a specific base station, but is in an idle mode may be called an RRC idle (or RRC_IDLE) mode.

On the other hand, although not illustrated in the drawing, the terminal may report information on functions supported by the terminal to a network.

Specifically, after the terminal is connected to the base station, or while the terminal is connected to the base station, the base station may request UE capability information from the terminal. For example, the base station may transmit a UE capability enquiry message for requesting the UE capability information from the terminal if the UE capability information is needed for scheduling or the like.

The terminal may transmit the UE capability information to the base station in response to the UE capability enquiry message. It is assumed that the terminal according to the present disclosure supports an LAA function, and the base station confirms that the terminal supports the LAA function through the received UE capability information.

After the terminal performs the connection to the base station, at operation S515, the base station may transmit, to the terminal, a measurement request message that includes cell measurement setup information in order to set the terminal to perform cell measurement. In this case, the cell measurement setup information may include measurement setup information for the cell that uses the second band.

Accordingly, the terminal may perform cell measurement in accordance with the received measurement setup information, and the result of performing the cell measurement may include the measurement result of the cell that uses the second band.

If a report condition that is included in the measurement setup information is satisfied, at operation S520, the terminal that has performed the cell measurement may report the result of the cell measurement to the base station. In this case, the report condition that is included in the measurement setup information may include, for example, a predetermined period or a case where the measurement result exceeds a predetermined value, and if the predetermined period arrives or the cell measurement result exceeds the predetermined value, the terminal may report the cell measurement result to the base station.

The base station that has received the cell measurement result may determine whether the cell of the second band can be added to the terminal. That is, the base station can determine whether the CA that uses the cell of the second band as the secondary carrier is possible.

If it is determined that the addition of the second band cell is possible, the base station, at operation S525, may transmit a setup message for additionally setting the corresponding second band cell to the terminal. For example, in order to additionally set the second band cell to the terminal, the base station may transmit an RRC connection reconfiguration message to the terminal.

At operation S530, the terminal that has received the setup message may transmit a confirmation message with respect to the setup message for additionally setting the second band cell. For example, the terminal may transmit an RRC connection reconfiguration complete message to the base station.

On the other hand, at operation S535 or S540, the terminal may confirm whether a request for use of the second wireless communication system that uses the second band is sensed. The terminal may confirm whether the request for use of the second wireless communication system is sensed even at the operation before the second band cell is additionally set to the terminal (e.g., operation S535). Further, the terminal may confirm whether the request for use of the second wireless communication system is sensed at operation S540 after the second band cell is additionally set to the terminal. However, at operation S535, the process of confirming whether the request for use of the second wireless communication system is sensed may be omitted.

A case where the request for use of the second wireless communication system is sensed may be exemplified as follows:

A case where power of the wireless LAN of the terminal is turned off,

A case where wireless LAN background scanning is performed (for positioning that is triggered from the operating system) even if the wireless LAN of the terminal is turned off; or A case where the terminal moves to an area in which usability of the wireless LAN is high, such as user's home or office, even if the wireless LAN of the terminal is turned off (location grasping using information, such as GPS, cell ID, and wireless LAN identifier).

If the terminal senses the request for use of the second wireless communication system, in an embodiment, instead of the method for re-reporting the UE capability information according to the above, a reporting method through change of a measurement result value is proposed.

Specifically, at operation S515, if measurement setup information is received, the terminal may continuously perform cell measurement in accordance with the measurement setup information, and if a report condition that is included in the measurement setup information is satisfied, the terminal may transmit the measurement result to the base station.

Accordingly, if the report condition is satisfied, the terminal, at operation S550, may report the measurement result to the base station. As described above, the report condition that is included in the measurement setup information may include, for example, a predetermined period or a case where the measurement result exceeds a predetermined value, and if the predetermined period arrives or the cell measurement result exceeds the predetermined value, the terminal may report the cell measurement result to the base station.

On the other hand, in the case of reporting the measurement result, the terminal may report that the received signal of the second band cell is equal to or smaller than the predetermined value regardless of the reception strength of the signal that is actually measured in the second band cell.

For example, if a request for use of the second wireless communication system (e.g., use of wireless LAN) is sensed, the terminal may report that the strength of the received signal of the second band cell is bad (e.g., the strength of the received signal is equal to or smaller than the predetermined value) to the base station although the strength of the received signal that is actually measured in the second band cell is good (e.g., the strength of the received signal is larger than the predetermined value).

Accordingly, the base station may determine that the connection state of the terminal in the second band cell is not good, and may detach the second band cell related setup information of the terminal at operation S560. That is, the terminal and the base station may interrupt the communications with the first wireless communication system that is performed through the second band.

On the other hand, in the case of using the above-described method, the terminal and the base station may wait for a setup change from the base station after transmitting the measurement report without attempting to detach the RRC connection or to perform reestablishment. Through this, the terminal may continuously perform communications with the base station of the first wireless communication system through the first band even in the case where the request for use of the second wireless communication system is sensed. That is, through the above-described procedure, the terminal may guide the detaching of the setup of the second band cell without detaching from the base station or changing the UE capability information.

Figure 6:
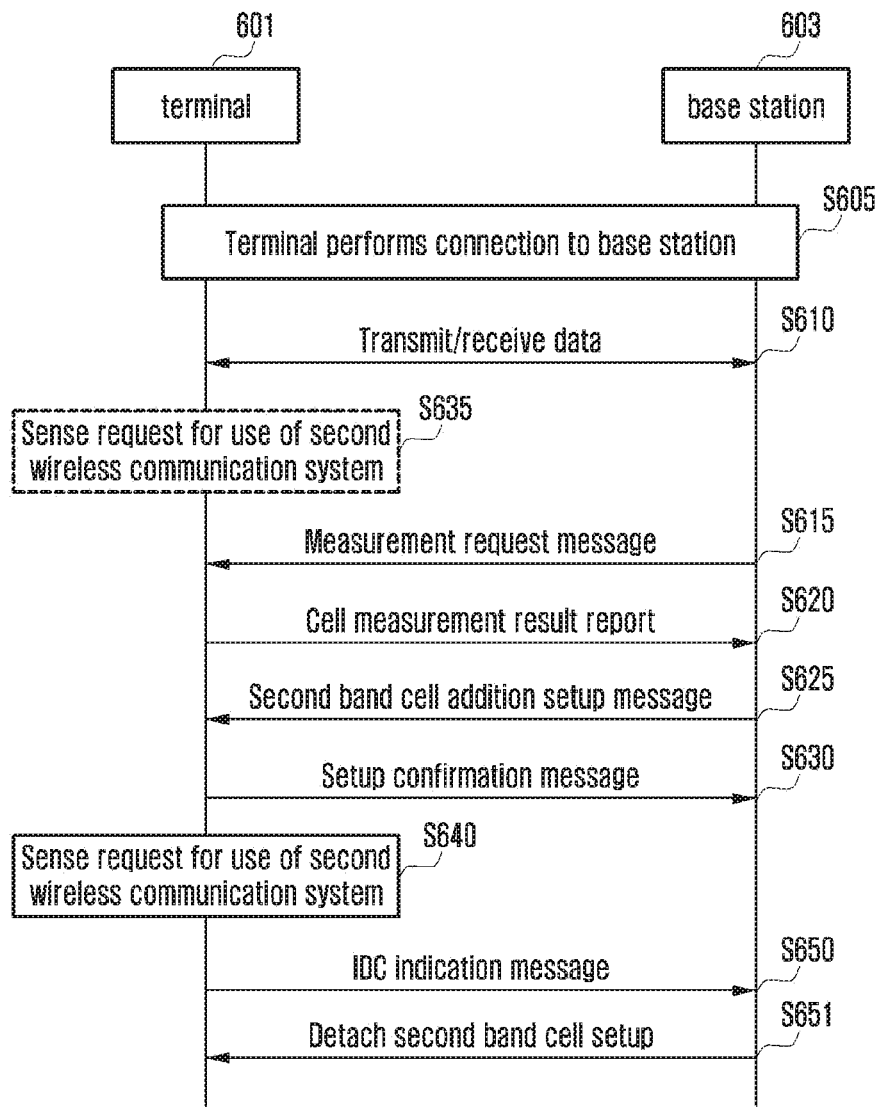
FIG. 6 is a diagram illustrating a method for receiving a service through different wireless communication systems according to an embodiment of the present disclosure.

FIG. 6 is a diagram illustrating a method for receiving a service through different wireless communication systems according to an embodiment of the present disclosure.

Referring to FIG. 6, at operation S605, a terminal 601 may perform a connection to a base station 603.

At operation S610, the terminal that is connected to the base station may transmit/receive data to/from the base station through the first band. As described above, a state where the terminal is connected to the base station to transmit/receive data to/from the base station may be called an RRC connected (or RRC_CONNECTED) mode. In contrast, a state where the terminal is not connected to a specific base station, but is in an idle mode may be called an RRC idle (or RRC_IDLE) mode.

On the other hand, although not illustrated in the drawing, the terminal may report information on functions supported by the terminal to a network.

Specifically, after the terminal is connected to the base station, or while the terminal is connected to the base station, the base station may request UE capability information from the terminal. For example, the base station may transmit a UE capability enquiry message for requesting the UE capability information from the terminal if the UE capability information is needed for scheduling or the like.

The terminal may transmit the UE capability information to the base station in response to the UE capability enquiry message. It is assumed that the terminal according to the present disclosure supports an LAA function, and the base station confirms that the terminal supports the LAA function through the received UE capability information.

After the terminal performs the connection to the base station, at operation S615, the base station may transmit, to the terminal, a measurement request message that includes cell measurement setup information in order to set the terminal to perform cell measurement. In this case, the cell measurement setup information may include measurement setup information for the cell that uses the second band.

Accordingly, the terminal may perform cell measurement in accordance with the received measurement setup information, and the result of performing the cell measurement may include the measurement result of the cell that uses the second band.

If a report condition that is included in the measurement setup information is satisfied, at operation S620, the terminal that has performed the cell measurement may report the result of the cell measurement to the base station. In this case, the report condition that is included in the measurement setup information may include, for example, a predetermined period or a case where the measurement result exceeds a predetermined value, and if the predetermined period arrives or the cell measurement result exceeds the predetermined value, the terminal may report the cell measurement result to the base station.

The base station that has received the cell measurement result may determine whether the cell of the second band can be added to the terminal. That is, the base station can determine whether the CA that uses the cell of the second band as the secondary carrier is possible.

If it is determined that the addition of the second band cell is possible, the base station, at operation S625, may transmit a setup message for additionally setting the corresponding second band cell to the terminal. For example, in order to additionally set the second band cell to the terminal, the base station may transmit an RRC connection reconfiguration message to the terminal.

At operation S630, the terminal that has received the setup message may transmit a confirmation message with respect to the setup message for additionally setting the second band cell. For example, the terminal may transmit an RRC connection reconfiguration complete message to the base station.

On the other hand, at operation S635 or S640, the terminal may confirm whether a request for use of the second wireless communication system that uses the second band is sensed. The terminal may confirm whether the request for use of the second wireless communication system is sensed even at the operation before the second band cell is additionally set to the terminal (e.g., operation S635). Further, the terminal may confirm whether the request for use of the second wireless communication system is sensed at operation S640 after the second band cell is additionally set to the terminal. However, at operation S635, the process of confirming whether the request for use of the second wireless communication system is sensed may be omitted.

A case where the request for use of the second wireless communication system is sensed may be exemplified as follows:

A case where power of the wireless LAN of the terminal is turned off,

A case where wireless LAN background scanning is performed (for positioning that is triggered from the operating system) even if the wireless LAN of the terminal is turned off; or A case where the terminal moves to an area in which usability of the wireless LAN is high, such as user's home or office, even if the wireless LAN of the terminal is turned off (location grasping using information, such as GPS, cell ID, and wireless LAN identifier).

If the terminal senses the request for use of the second wireless communication system, in an embodiment, a method for detaching the second band cell that is set to the terminal using an in-device coexistence interference (IDC) indication message is proposed.

The terminal that supports an IDC function may transmit an IDC indication message to the base station in order to report a transmission/reception interference problem between different devices (or modules) in the terminal. However, if the base station does not set the IDC function, the terminal that supports the IDC function is unable to transmit the IDC message even in the case where interference occurs between the different devices in the terminal. Accordingly, in this embodiment, it is assumed that the terminal supports the IDC function, and the base station sets the IDC function to the terminal.

Accordingly, if the terminal senses a request for use of the second wireless communication system in a state where the IDC function is set to the terminal, at operation S650, the terminal may transmit the IDC indication message to the base station to inform that collision has occurred in the second band. In this case, the IDC indication message may include second band frequency information to be used for the second wireless communication system.

At operation S651, the base station that has received the IDC indication message may detach the second band cell related setup information from the terminal in order to prevent the collision in the second band. That is, the terminal and the base station may interrupt the communications with the first wireless communication system that is performed through the second band.

Further, the base station may change the SCell to a cell that uses a frequency that does not interfere with the frequency to be used for the second wireless communication system among frequencies of the second band using frequency information that is included in the IDC indication message.

On the other hand, in the case of using the above-described method, the terminal and the base station may wait for a setup change from the base station after transmitting the IDC indication message without attempting to detach the RRC connection or to perform reestablishment. Through this, the terminal may continuously perform communications with the base station of the first wireless communication system through the first band even in the case where the request for use of the second wireless communication system is sensed. Through the above-described procedure, the terminal may guide the detaching of the setup of the second band cell without detaching from the base station or changing the UE capability information.

Figure 7:
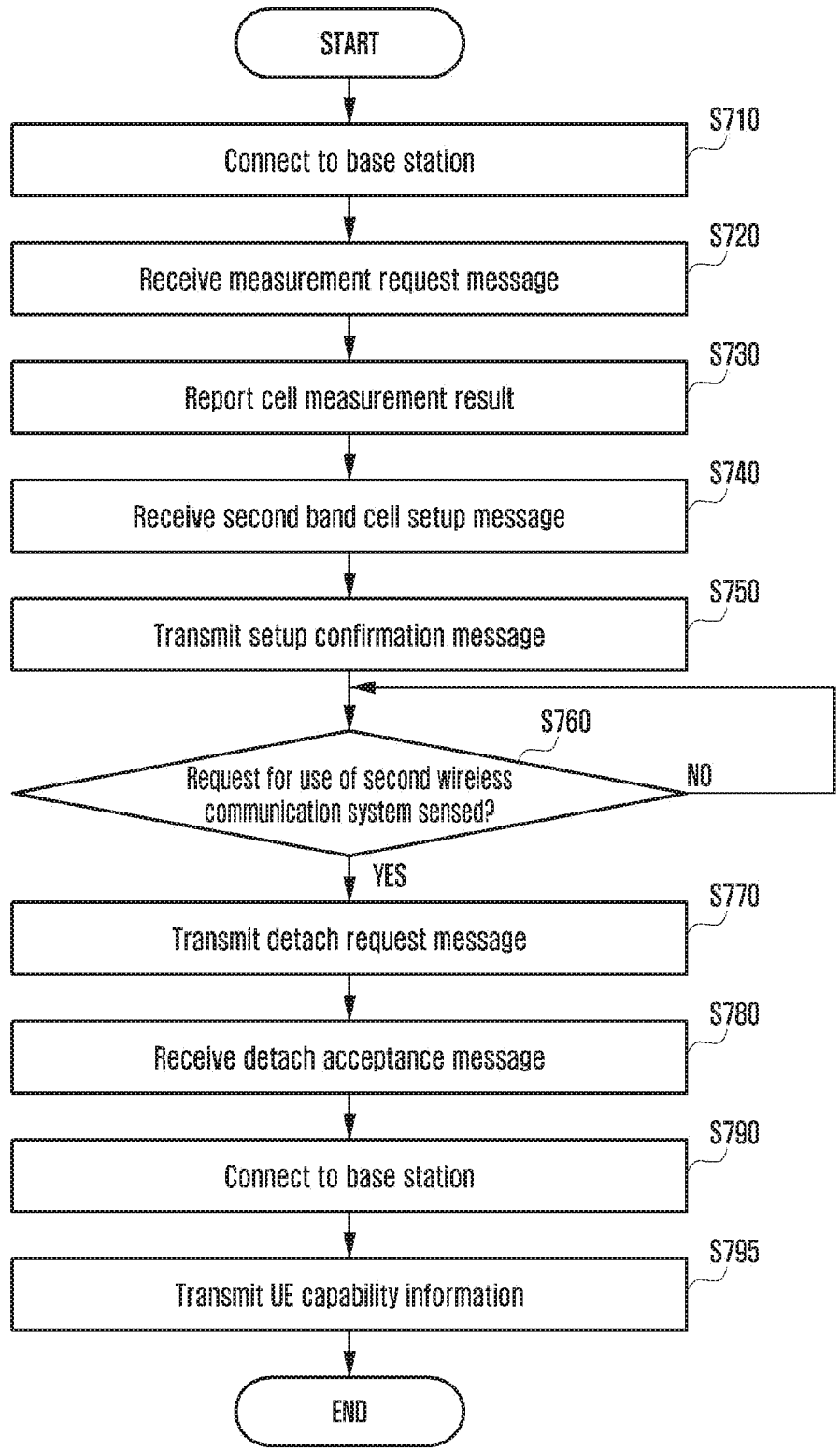
FIG. 7 is a diagram illustrating a method for a terminal to receive a service through different wireless communication systems according to an embodiment of the present disclosure.

FIG. 7 is a diagram illustrating a method for a terminal to receive a service through different wireless communication systems according to an embodiment of the present disclosure.

Referring to FIG. 7, at operation S710, a terminal may perform a connection to a base station. Accordingly, the terminal may transmit/receive data to/from the base station through the first band. That is, the terminal may be in an RRC connected mode state in which the terminal is connected to the base station to transmit/receive the data to/from the base station.

On the other hand, although not illustrated in the drawing, the terminal may report UE capability information that corresponds to a function supported by the terminal to a network.

Specifically, while the terminal is connected to the base station or after the terminal is connected to the base station, the base station may request the UE capability information from the terminal. For example, the base station may transmit a UE capability enquiry message for requesting the UE capability information if the UE capability information is needed for scheduling or the like.

Further, the base station may receive a message that includes the UE capability information in response to the UE capability enquiry message. In the present disclosure, it is assumed that the terminal supports an LAA function, and the base station confirms that the terminal supports the LAA function through the received UE capability information.

After being connected to the base station, the terminal, at operation S720, may receive a measurement request message that includes cell measurement setup information. The cell measurement setup information may include measurement information of a cell that uses the second band.

The terminal that has received the measurement information may perform cell measurement in accordance with the measurement setup information, and the result of performing the cell measurement may include the measurement result of the cell that uses the second band.

At operation S730, the terminal that has performed the cell measurement may transmit the cell measurement result to the base station. The terminal may transmit the measurement result to the base station if a report condition that is included in the measurement setup information is satisfied. For example, the report condition that is included in the measurement setup information may include, for example, a predetermined period or a case where the measurement result exceeds a predetermined value, and if the predetermined period arrives or the cell measurement result exceeds the predetermined value, the terminal may report the cell measurement result to the base station.

The base station that has received the measurement result may determine whether the second band cell can be added to the terminal, and if it is determined that the addition of the second band cell is possible, the base station may transmit a setup message for additionally setting the second band cell to the terminal. Accordingly, at operation S740, the terminal may receive the setup message for setting an unlicensed band cell from the base station. The setup message for setting the second band cell may include, for example, an RRC connection reconfiguration message.

Further, at operation S750, the terminal may transmit a setup confirmation message that is a response message to the setup message to the base station.

Thereafter, at operation S760, the terminal may confirm whether the request for use of the second wireless communication system (e.g., wireless LAN) that uses the unlicensed band is sensed. A case where the request for use of the second wireless communication system is sensed may be exemplified as follows:

- A case where power of the wireless LAN of the terminal is turned off;
- A case where wireless LAN background scanning is performed (for positioning that is triggered from the operating system) even if the wireless LAN of the terminal is turned off; or
- A case where the terminal moves to an area in which usability of the wireless LAN is high, such as user's home or office, even if the wireless LAN of the terminal is turned off (location grasping using information, such as GPS, cell ID, and wireless LAN identifier).

If the terminal senses the request for use of the second wireless communication system (i.e., "YES" at operation S760), in an embodiment, a method for the terminal to be detached from the network and then to be reattached to the base station to re-report the UE capability information that corresponds to a function that is supported by the terminal is proposed.

Accordingly, at operation S770, the terminal may transmit a detaching request message for detaching the terminal from the network to the MME through the base station.

If the terminal connection is detached by the message, the terminal, at operation S780, may receive a detaching acceptance message. Further, at operation S790, the terminal may be reattached to the base station.

The terminal that has been reattached to the base station may receive a UE capability information request from the base station, and at operation S795, the terminal may re-transmit the UE capability information to the base station in accordance with the request from the base station.

When transmitting the UE capability information, the terminal may report that the terminal does not support an LAA function, although the terminal supports the LAA function, to cause the base station not to set an LAA related function. Accordingly, through the above-described procedure, the base station may determine that the terminal does not support the LAA function, and may not set the LAA function.

Through the above-described method, the terminal may perform communications with the first wireless communication system through the first band, and may perform communications with the second wireless communication system through the second band in accordance with the request for use of the second wireless communication system.

Figure 8:
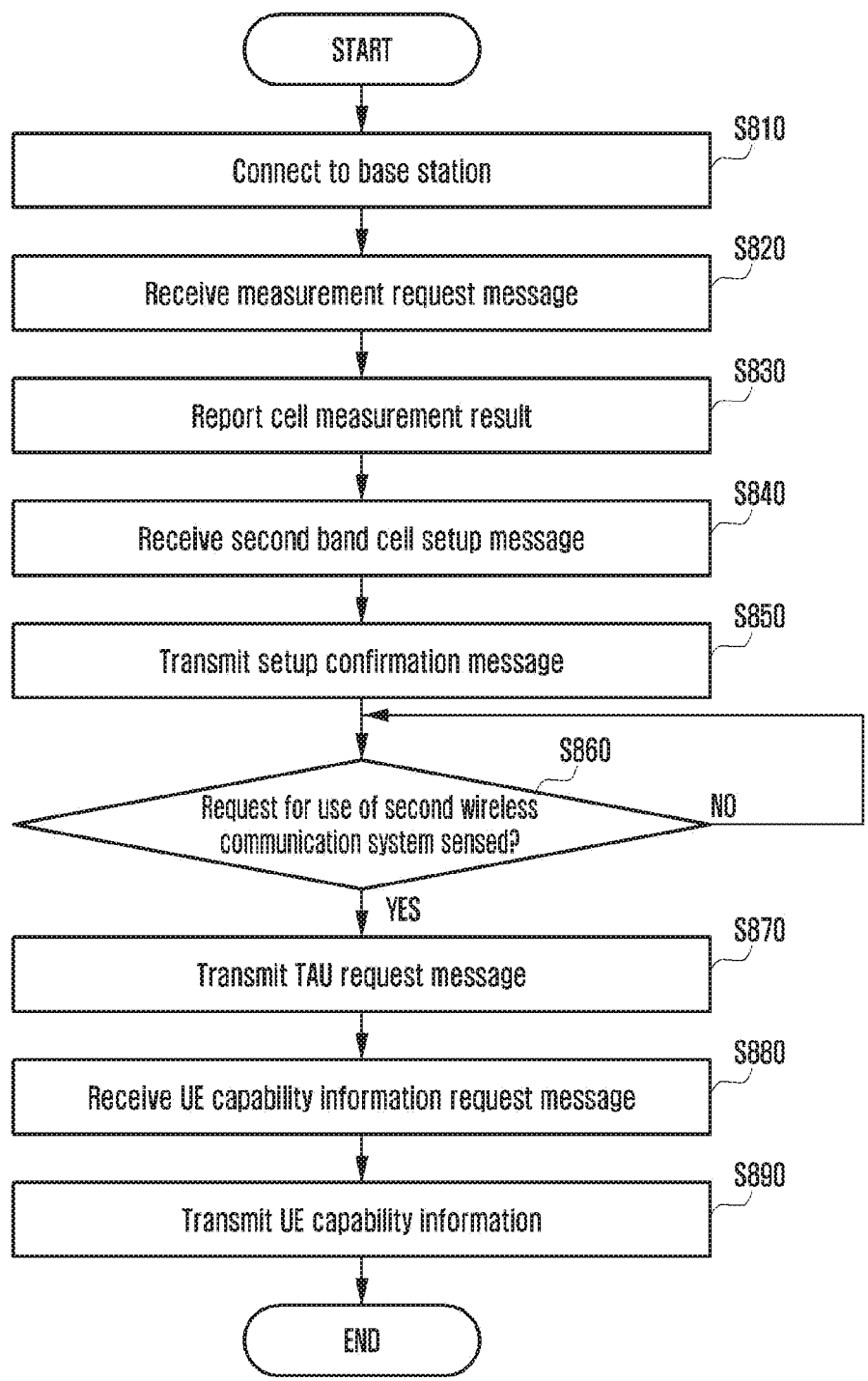
FIG. 8 is a diagram illustrating a method for a terminal to receive a service through different wireless communication systems according to an embodiment of the present disclosure.

FIG. 8 is a diagram illustrating a method for a terminal to receive a service through different wireless communication systems according to an embodiment of the present disclosure.

Referring to FIG. 8, the terminal may report the result of cell measurement through connection to the base station, and thus a second band cell may be set to the terminal. Since operations S810, S820, S830, S840, S850 and S860 in FIG. 8 are similar to operations S710, S720, S730, S740, S750, and S760 in FIG. 7, the detailed explanation thereof will be omitted.

If the terminal senses the request for use of the second wireless communication system (i.e., "YES" at operation S860), in an embodiment, instead of the method for the terminal to be detached from the network according to the above, a method for indicating that the UE capability information has been changed using the existing used message and for re-reporting the UE capability information that includes UE capability is proposed.

Specifically, at operation S870, the terminal may transmit a message that includes information indicating that the UE capability information has been changed to the MME through the base station to inform the MME that the UE capability information has been changed. In this case, the terminal may include the information indicating that the UE capability information has been changed in a TAU request message that means occurrence of a change of a tracking area to transmit the TAU request message to the MME. In the present disclosure, for convenience, the TAU request message is exemplified, but the scope of the present disclosure is not limited thereto. That is, the terminal may inform the MME that the UE capability information has been changed using an LAU request message or an RAU request message.

Further, in the information indicating that the UE capability information has been changed, a field "UE radio capability information update needed," which is used when a function, such as GSM/CDMA2000 of the terminal, is changed, may be used. That is, the terminal may set the field "UE radio capability information update needed" to "1," and may include "1" to the TAU request message to be transmitted.

Further, at operation S880, the terminal may receive a UE capability information request message for requesting the UE capability information from the base station. At operation S890, the terminal that has received the UE capability information request message may transmit the UE capability information to the base station. In this case, the terminal may report that the terminal does not support an LAA function, although the terminal supports the LAA function, to cause the base station not to set an LAA related function. Accordingly, the base station may determine that the terminal does not support the LAA function, and may not set the LAA function, but may detach the second band cell that has been set to the terminal.

Through the above-described method, the terminal may perform communications with the first wireless communication system through the first band, and may perform communications with the second wireless communication system through the second band in accordance with the request for use of the second wireless communication system.

Figure 9:
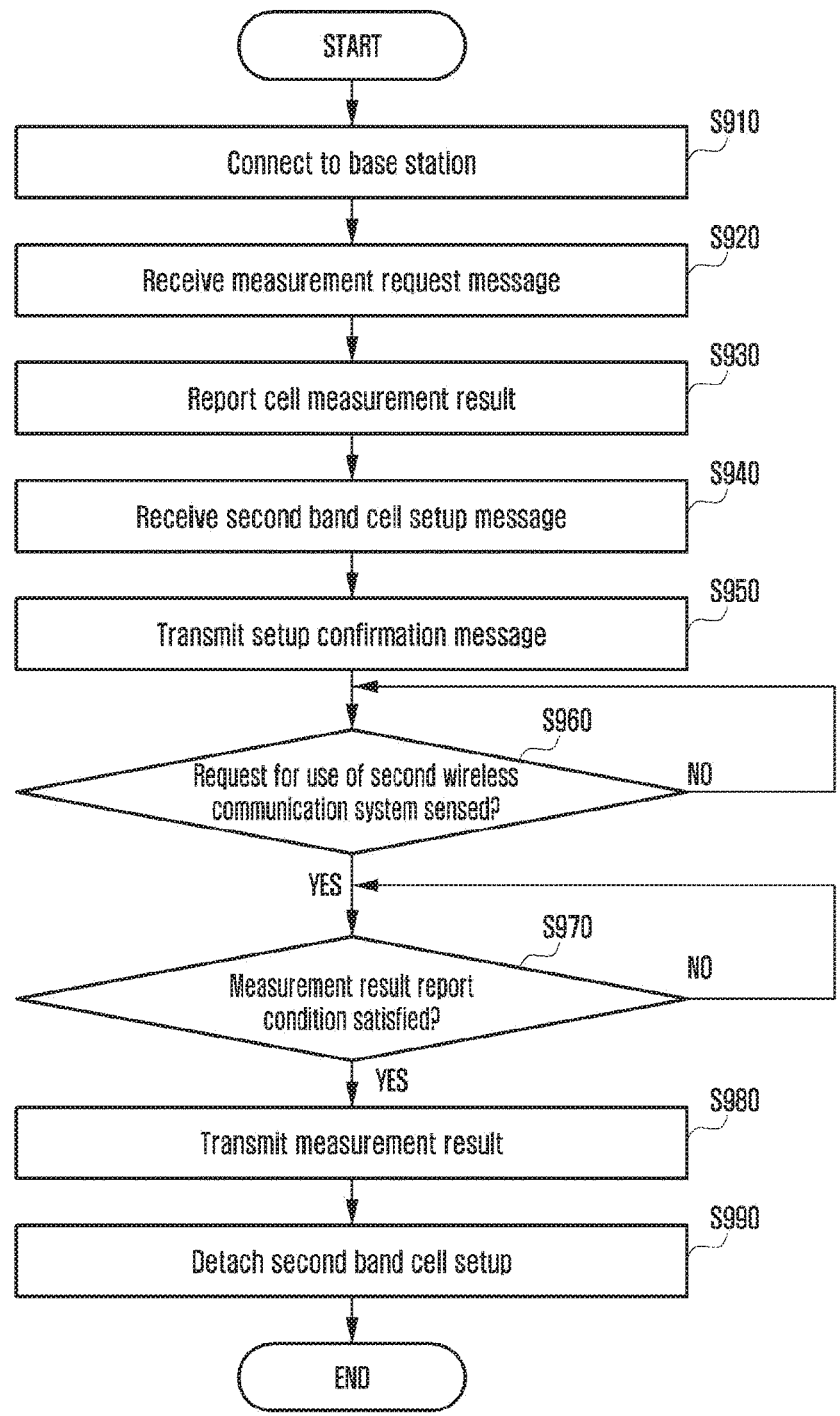
FIG. 9 is a diagram illustrating a method for a terminal to receive a service through different wireless communication systems according to an embodiment of the present disclosure.

FIG. 9 is a diagram illustrating a method for a terminal to receive a service through different wireless communication systems according to an embodiment of the present disclosure.

Referring to FIG. 9, the terminal may report the result of cell measurement through connection to the base station, and thus an unlicensed band cell may be set to the terminal. Since operations S910, S920, S930, S940, S950, and S960 in FIG. 9 are similar to operations S710, S720, S730, S740, S750, and S760 in FIG. 7, the detailed explanation thereof will be omitted.

If the terminal senses the request for use of the second wireless communication system (i.e., "YES" at operation S960), in an embodiment, instead of the method for re-reporting the UE capability information according to the above, a reporting method through change of a measurement result value is proposed.

At operation S970, the terminal may determine whether a report condition for reporting the measurement result of the terminal is satisfied.

The report condition may include, for example, a predetermined period or a case where the measurement result exceeds a predetermined value. Accordingly, if the report condition is satisfied (i.e., "YES" at operation S970), the terminal, at operation S980, may transmit the measurement result to the base station. In the case of reporting the measurement result, the terminal may report that the received signal of the second band cell is equal to or smaller than a predetermined value regardless of the reception strength of the signal that is actually measured in the second band cell.

For example, if the request for use of the second wireless communication system is sensed, the terminal may report that the strength of the received signal of the second band cell is bad (e.g., the strength of the received signal is equal to or smaller than the predetermined value) to the base station although the strength of the received signal that is actually measured in the second band cell is good (e.g., the strength of the received signal is larger than the predetermined value).

Accordingly, the base station may determine that the connection state of the terminal in the second band cell is not good, and may detach the second band cell related setup information of the terminal. Accordingly, the terminal, at operation S990, may detach the setup of the second band cell in accordance with the detaching of the base station.

On the other hand, in the case of using the above-described method, the terminal and the base station may wait for a setup change from the base station after transmitting the measurement report without attempting to detach the RRC connection or to perform reestablishment. Through this, the terminal may continuously perform communications with the LTE base station through the first band even in the case where the request for use of the second wireless communication system is sensed. That is, through the above-described procedure, the terminal may guide detaching of the setup of the second band cell without detaching from the base station or changing the UE capability information.

Figure 10:
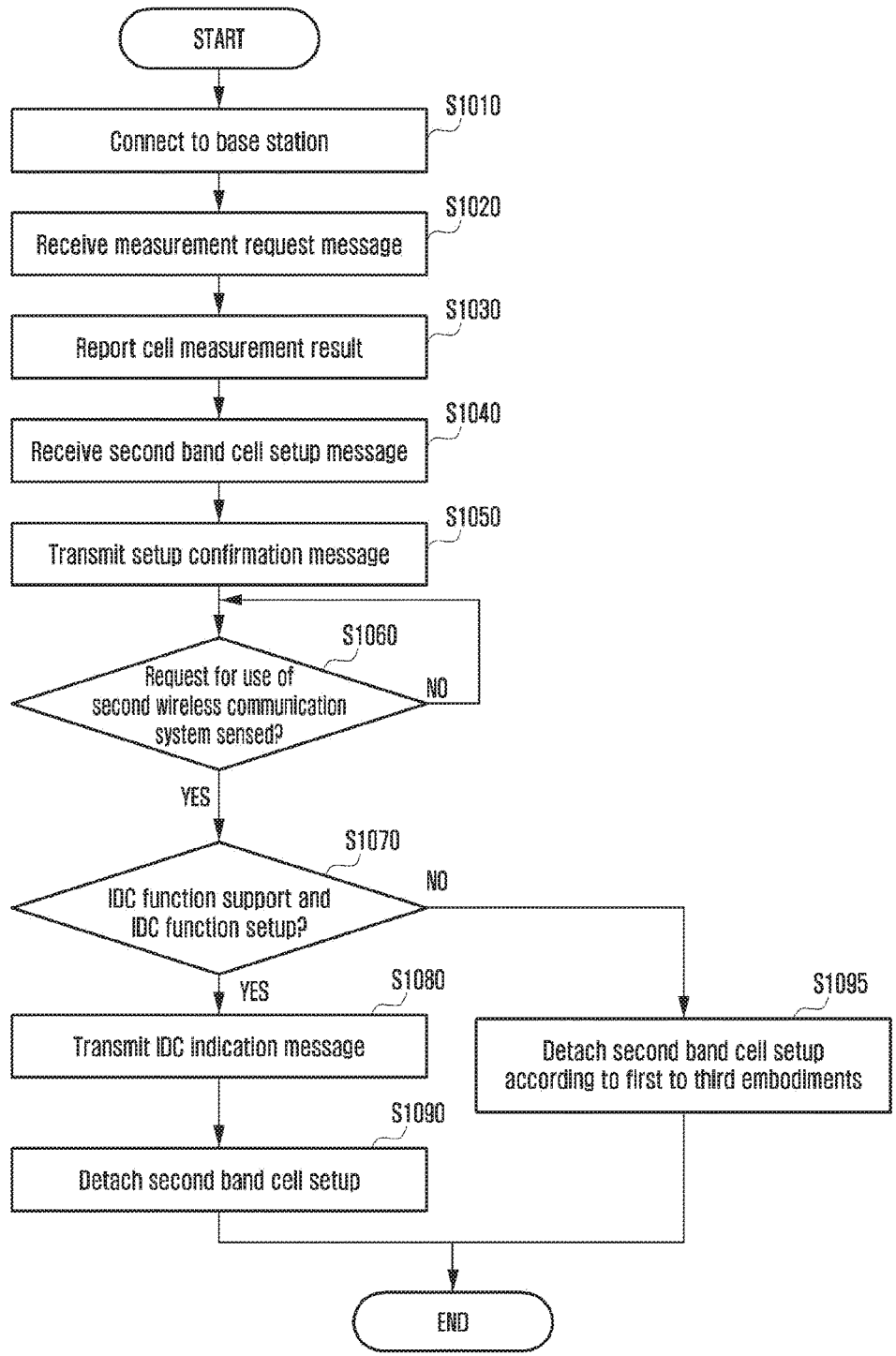
FIG. 10 is a diagram illustrating a method for a terminal to receive a service through different wireless communication systems according to an embodiment of the present disclosure.

FIG. 10 is a diagram illustrating a method for a terminal to receive a service through different wireless communication systems according to an embodiment of the present disclosure.

Referring to FIG. 10, the terminal may report the result of cell measurement through connection to the base station, and thus an unlicensed band cell may be set to the terminal. Since operations S1010, S1020, S1030, S1040, S1050, and S1060 in FIG. 9 are similar to operations S710, S720, S730, S740, S750, and S760 in FIG. 7, the detailed explanation thereof will be omitted.

If the terminal senses the request for use of the second wireless communication system (i.e., "YES" at operation S1060), in an embodiment, a method for a terminal to detach the second band cell that is set in the terminal through an IDC indication message is proposed.

The terminal that supports an IDC function may transmit an IDC indication message to the base station in order to report a transmission/reception interference problem between different devices (or modules) in the terminal. However, if the base station does not set the IDC function, the terminal that supports the IDC function is unable to transmit the IDC message even in the case where interference occurs between the different devices in the terminal.

Accordingly, if the terminal senses the request for use of the second wireless communication system, at operation S1070, the terminal may determine whether an IDC function is supported and whether the IDC function is set.

If the terminal supports the IDC function and the IDC function is set in the terminal (i.e., "YES" at operation S1070), then, at operation S1080, the terminal may inform the base station that collision has occurred in the second band through transmission of an IDC indication message. In this case, the IDC indication message may include second band frequency information to be used for the second wireless communication system.

The base station may detach the second band cell related setup information from the terminal in order to prevent the collision in the second band. Further, the base station may change the SCell to a cell that uses a frequency that does not interfere with the frequency to be used for the second wireless communication system among frequencies of the second band using frequency information that is included in the IDC indication message.

Accordingly, at operation S1090, the terminal may detach the setup of the second band cell in accordance with the detaching of the setup of the base station.

On the other hand, in the case where the terminal does not support the IDC function or the IDC function is not set in the terminal although the terminal supports the IDC function (i.e., "NO" at operation S1070), the terminal, at operation S1095, may inform the base station of the collision in an unlicensed band frequency using any one of the methods as described above according to the first to third embodiments, and may detach the setup of the second band cell that is set in the terminal. Since the detailed contents are the same as those as described above with reference to FIGS. 7 to 8, the explanation thereof will be omitted.

Figure 11:
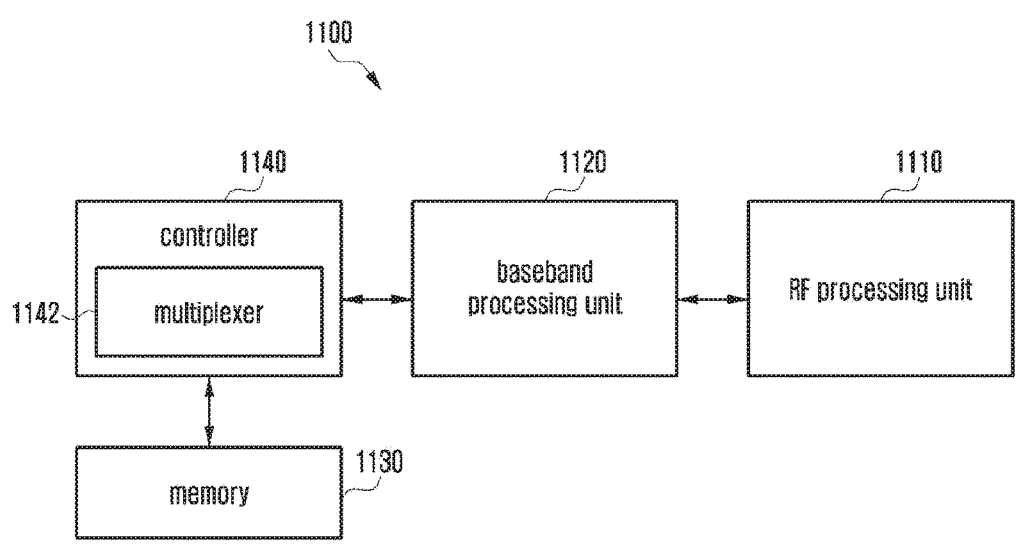
FIG. 11 is a diagram illustrating the configuration of a terminal according to an embodiment of the present disclosure.

FIG. 11 is a diagram illustrating the configuration of a terminal 1100 according to an embodiment of the present disclosure.

Referring to FIG. 11, the terminal 1100 includes a radio frequency (RF) processing unit 1110, a baseband processing unit 1120, a memory (or storage unit) 1130, and a controller 1140. The controller may be a circuit, an application-specific integrated circuit or at least one processor.

The RF processing unit 1110 performs transmission/reception of a signal through a wireless channel, such as signal band conversion and amplification. That is, the RF processing unit 1110 up-converts a baseband signal that is provided from the baseband processing unit 1120 into an RF band signal to transmit the converted RF band signal through an antenna, and down-converts the RF band signal that is received through the antenna into the baseband signal. For example, the RF processing unit 1110 may include a transmission filter, a reception filter, an amplifier, a mixer, an oscillator, a digital to analog converter DAC, and an analog to digital convertor (ADC). In FIG. 11, only one antenna is illustrated, but the terminal may be provided with a plurality of antennas. Further, the RF processing unit 1110 may include a plurality of RF chains. Further, the RF processing unit 1110 may perform beamforming. For the beamforming, the RF processing unit 1110 may adjust the phase and the size of each signal that is transmitted or received through the plurality of antennas or antenna elements.

The baseband processing unit 1120 performs conversion between a baseband signal and a bit string in accordance with the PHY standard of the system. For example, in the case of data transmission, the baseband processing unit 1120 generates complex symbols through encoding and modulation of a transmission bit string. Further, in the case of data reception, the baseband processing unit 1120 restores a reception bit string through demodulation and decoding of the baseband signal that is provided from the RF processing unit 1110. For example, in the case of following OFDM, the baseband processing unit 1120, during data transmission, generates complex symbols through decoding and modulation of the transmission bit string, performs mapping of the complex symbols on secondary carriers, and then constructs OFDM symbols through an inverse fast fourier transform (IFFT) operation and cyclic prefix (CP) insertion. Further, during data reception, the baseband processing unit 1120 divides the baseband signal that is provided from the RF processing unit 1110 into OFDM symbol units, restores signals that are mapped on the secondary carriers through a fast fourier transform (FFT) operation, and then restores the reception bit string through demodulation and decoding.

The baseband processing unit 1120 and the RF processing unit 1110 transmit and receive the signals as described above. Accordingly, the baseband processing unit 1120 and the RF processing unit 1110 may be called a transmission unit, a reception unit, a transceiver unit, or a transceiver. Further, at least one of the baseband processing unit 1120 and the RF processing unit 1110 may include a plurality of communication modules for supporting plural different wireless communication technologies. Further, at least one of the baseband processing unit 1120 and the RF processing unit 1110 may include different communication modules in order to process different frequency band signals. For example, the different wireless connection technologies may include a wireless LAN (e.g., institute of electrical and electronics engineers (IEEE) 802.11) and a cellular network (e.g., LTE). Further, the different frequency bands may include super high frequency (SHF) (e.g., 2.5 GHz and 5 GHz) band, and millimeter (mm) waves (e.g., 60 GHz).

The memory 1130 may store therein basic programs for the operation of the terminal, application programs, and data such as setup information. In particular, the memory 1130 may store information related to a wireless LAN node that performs wireless communications using a wireless LAN connection technology. Further, the memory 1130 may provide data that is stored in accordance with the request from the controller 1140.

The controller 1140 controls the entire operation of the terminal. For example, the controller 1140 operates to transmit and receive the signals through the baseband processing unit 1120 and the RF processing unit 910. Further, the controller 1140 may write and read data in the memory 1130. For this, the controller 1140 may include at least one processor. For example, the controller 1140 may include a communication processor (CP) that controls communications, and an application processor (AP) that controls upper layers, such as application programs. According to an embodiment of the present disclosure, the controller 1140 includes a multiplexer 1142 that operates in a multiplexing mode. For example, the controller 1140 may control the terminal to perform operations illustrated in FIGS. 7 to 10.

Further, in an embodiment of the present disclosure, the controller 1140 may transmit/receive data to/from the base station through the first band through a connection to the base station. Further, the controller 1140 may report the UE capability information to the base station in accordance with the UE capability information request from the base station. Further, the controller 1140 may receive the measurement request message that includes cell setup information, and may operate to measure the cell in accordance with the measurement setup information. Further, the controller 1140 may report the cell measurement result to the base station. The cell measurement result may include the measurement result for the second band cell, and may additionally set the second band cell to the terminal in accordance with the cell measurement result.

On the other hand, after the second band cell is additionally set to the terminal, the controller 1140 may confirm whether the request for use of the second wireless communication system is sensed.

If the request for use of the second wireless communication system is sensed, the controller 1140 may re-report the UE capability information through detaching from the network, but reattaching to the base station. Specifically, in order to detach from the network, the controller 1140 may transmit a detach request message to the MME. If the terminal is detached through the detach request message, the controller may perform reattaching to the base station, and after reattaching to the base station, the controller 1140 may report the UE capability information to the base station in accordance with the UE capability information request from the base station.

When the controller 1140 reports the UE capability information, the terminal may report that the terminal does not support an LAA function, although the terminal supports the LAA function, to cause the base station not to set an LAA related function. Accordingly, through the above-described procedure, the base station may determine that the terminal does not support the LAA function, and may not set the LAA function.

Further, if the request for use of the second wireless communication system is sensed, the controller 1140 may inform that the UE capability information has been changed using the existing used message, and may operate to re-report the UE capability information that includes a function that is supported by the terminal.

Specifically, the controller 1140 may operate to transmit a message that includes information indicating that the UE capability information has been changed to the MME through the base station. In this case, the controller 1140 may include the information indicating that the UE capability information has been changed in a TAU request message to be transmitted to the MME. Further, the controller 1140 may include the information indicating that the UE capability information has been changed in an LAU request message or an RAU request message to be transmitted.

As the information indicating that the UE capability information has been changed, the controller 1140 may use a field "UE radio capability information update needed," which is used when a function, such as GSM/CDMA2000 of the terminal, is changed.

If the message that includes the information indicating that the UE capability information has been changed is transmitted, the controller 1140 may receive a UE capability information request message from the base station, and may transmit the UE capability information accordingly. In this case, the controller 1140 may report that the terminal does not support an LAA function, although the terminal supports the LAA function, to cause the base station not to set an LAA related function. Accordingly, the base station may determine that the terminal does not support the LAA function, and may not set the LAA function, but may detach the second band cell that has been set to the terminal. That is, the terminal and the base station may interrupt the communications with the first wireless communication system, which are performed through the second band.

Further, if the request for use of the second wireless communication system is sensed, the controller 1140 may guide the detaching of the second band cell through changing and reporting of the measurement result value.

The controller 1140 may report the measurement result in accordance with a report condition that is included in the cell measurement setup information that is received from the base station. The report condition may include a predetermined period or a case where the measurement result exceeds a predetermined value. Accordingly, if the report condition is satisfied, the controller 1140 may report the measurement result to the base station. In this case, the controller 1140 may report that the strength of the received signal of the second band cell is bad (e.g., the strength of the received signal is equal to or smaller than the predetermined value) to the base station although the strength of the received signal that is actually measured in the second band cell is good (e.g., the strength of the received signal is larger than the predetermined value), and the base station may determine that the connection state of the second band cell is not good, and may detach the second band cell related setup information. That is, the terminal and the base station may interrupt the communications with the first wireless communication system that is performed through the second band.

Further, if the request for use of the second wireless communication system is sensed, the controller 1140 may guide the detaching of the second band cell using an IDC indication message.

If the controller 1140 senses the request for use of the second wireless communication system, it may determine whether the terminal supports an IDC function and whether the IDC function is set to the terminal. If the terminal supports the IDC function and the IDC function is set to the terminal, the controller 1140 may transmit the IDC indication message to the base station to inform that collision has occurred in the second band. In this case, the IDC indication message may include second band frequency information to be used for the second wireless communication system.

The base station may detach the second band cell related setup information from the terminal in order to prevent the collision in the second band. That is, the terminal and the base station may interrupt the communications with the first wireless communication system that is performed through the second band. Further, the base station may change the SCell to a cell that uses a frequency that does not interfere with the frequency to be used for the second wireless communication system among frequencies of the second band using frequency information that is included in the IDC indication message. Accordingly, the controller 1140 may detach the setup of the second band cell in accordance with the setup detach of the base station.

On the other hand, if the terminal does not support the IDC function or the IDC function is not set to the terminal even in the case where the terminal supports the IDC function, the controller 1140 may detach the setup of the second band cell using any one of the methods according to the embodiments as described above.

Figure 12:
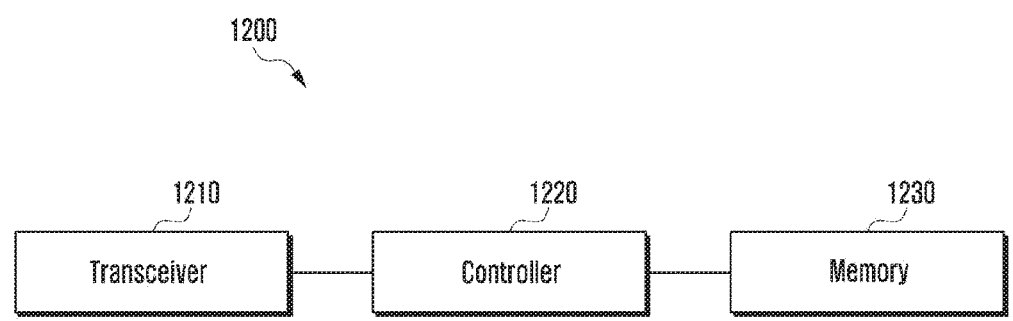
FIG. 12 is a diagram illustrating the configuration of a base station according to an embodiment of the present disclosure.

FIG. 12 is a diagram illustrating the configuration of a base station 1200 according to an embodiment of the present disclosure.

Referring to FIG. 12, the base station 1200 may include a transceiver (or communication unit) 1210, a controller 1220, and a memory (or storage unit) 1230.

The transceiver 1210 may perform communications with another network entity. The transceiver may transmit/receive signals to/from a terminal and an MME.

The controller 1220 may control the operation of the base station according to the present disclosure. The controller 1220 may operate to transmit/receive data to/from the terminal. Further, the controller 1220 may receive UE capability information from the terminal through transmission of a UE capability information request message. Further, the controller 1220 may transmit a measurement request message that includes cell measurement setup information so that the terminal performs cell measurement, and may receive the measurement result.

The measurement setup information may include measurement setup information for the second band cell, and thus the controller 1220 may receive the measurement result for the second band cell. Accordingly, the controller 1220 may additionally set the second band cell to the terminal.

On the other hand, if the request for use of the second wireless communication system is sensed in the terminal, the base station may be detached from the terminal, and then may be reattached to the terminal. Accordingly, the controller 1220 may re-receive the UE capability information from the terminal, and if information indicating that the terminal does not support an LAA function is included in the UE capability information, the controller 1220 may not additionally set the second band cell to the terminal.

Further, if the request for use of the second wireless communication system is sensed in the terminal, the terminal may transmit a message that includes information indicating that the UE capability information has been changed to the MME through the base station, and the controller 1220 may receive an initial context setup request message that does not include the UE capability information from the MME.

Accordingly, the controller 1220 may re-receive the UE capability information through requesting the UE capability information from the terminal, and if information indicating that the terminal does not support an LAA function is included in the UE capability information, the controller 1220 may not additionally set the second band cell to the terminal. Further, the controller 1220 may detach the second band cell related information that is set to the terminal. That is, the terminal and the base station may interrupt the communications with the first wireless communication system that is performed through the second band.

Further, if the request for use of the second wireless communication system is sensed in the terminal, the controller 1220 may receive the measurement result that the strength of the received signal of the second band cell is equal to or smaller than a predetermined value. Accordingly, the controller 1220 may determine that the connection state of the second band cell is not good, and may detach the second band cell related setup information. That is, the terminal and the base station may interrupt the communications with the first wireless communication system that is performed through the second band.

Further, if the request for use of the second wireless communication system is sensed in the terminal, the controller 1220 receives an IDC indication message. The controller 1220 that has received the IDC indication message may confirm that collision has occurred in the second band.

Accordingly, the controller 1220 may detach the second band cell related setup information from the terminal in order to prevent the collision in the second band. That is, the terminal and the base station may interrupt the communications with the first wireless communication system that is performed through the second band. Further, the IDC indication message may include second band frequency information to be used for the second wireless communication system, and the controller 1220 may change the SCell to a cell that uses a frequency that does not interfere with the frequency to be used for the second wireless communication system among frequencies of the second band using frequency information that is included in the IDC indication message.

The memory 1230 may store therein basic programs for the operation of the base station, application programs, and data such as setup information. Further, the memory 1230 may store therein UE capability information that is received from the terminal. Further, the memory 1230 may provide the stored data in accordance with the request from the controller 1140.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal for receiving a service through different wireless communication systems, the method comprising:
    receiving, from a base station of a first wireless communication system, a configuration message for configuring a secondary cell in an unlicensed band;
    identifying a request for use of a second wireless communication system using the unlicensed band;
    transmitting, to a mobility management entity (MME), a detach request message for detaching the terminal from a network; and
    reporting user equipment (UE) capability information including information that indicates the terminal does not support a licensed assisted access (LAA) after attaching to the base station.

2. The method of claim 1, wherein the identifying the request for use of the second wireless communication system comprises at least one of identifying that power of a wireless local area network (LAN) of the terminal has turned on, identifying that wireless LAN background scanning is performed, or identifying that the terminal moves to an area in which usability of the wireless LAN is high.

3. The method of claim 2, wherein the area is determined based on at least one of global positioning system (GPS) information, a cell identifier, and a wireless LAN identifier.

4. The method of claim 1, further comprising:
    communicating with the first wireless communication system using a licensed band; and
    communicating with the second wireless communication system using the unlicensed band.

5. The method of claim 1,
    wherein identifying the request for use of the second wireless communication system comprises transmitting a measurement report to the base station, and
    wherein the measurement report includes received signal strength less than a predetermined value.

6. A method by a base station of a first wireless communication system for providing a service to a terminal, the method comprising:
    transmitting, to the terminal, a configuration message for configuring a secondary cell in an unlicensed band;
    when a request for use of a second wireless communication system using the unlicensed band is identified and the terminal is detached from a network, transmitting a user equipment (UE) capability information request message after the terminal is attached to the base station; and
    receiving UE capability information including information that indicates the terminal does not support a licensed assisted access (LAA).

7. The method of claim 6, wherein the request is identified when power of a wireless local area network (LAN) of the terminal has turned on, wireless LAN background scanning is performed, or the terminal moves to an area in which usability of the wireless LAN is high.

8. The method of claim 7, wherein the area is determined based on at least one of global positioning system (GPS) information, a cell identifier, and a wireless LAN identifier.

9. The method of claim 6, wherein transmitting the configuration message comprises receiving a measurement report from the terminal.

10. The method of claim 9, wherein the measurement report includes received signal strength less than a predetermined value.

11. A terminal for receiving a service through different wireless communication systems, the terminal comprising:
    a transceiver; and
    a controller coupled with the transceiver and configured to:
        receive, from a base station of a first wireless communication system, a configuration message for configuring a secondary cell in an unlicensed band,
        identify a request for use of a second wireless communication system using the unlicensed band,
        transmit, to a mobility management entity (MME), a detach request message for detaching the terminal from a network, and
        report user equipment (UE) capability information including information that indicates the terminal does not support a licensed assisted access (LAA) after attaching to the base station.

12. The terminal of claim 11, wherein the request is identified when power of a wireless local area network (LAN) of the terminal has turned on, wireless LAN background scanning is performed, or the terminal moves to an area in which usability of the wireless LAN is high.

13. The terminal of claim 12, wherein the area is determined based on at least one of global positioning system (GPS) information, a cell identifier, and a wireless LAN identifier.

14. The terminal of claim 11, wherein the controller is further configured to:
    communicate with the first wireless communication system using a licensed band, and
    communicate with the second wireless communication system using the unlicensed band.

15. The terminal of claim 11,
    wherein the controller is further configured to transmit a measurement report to the base station, and
    wherein the measurement report includes received signal strength less than a predetermined value.

16. A base station of a first wireless communication system for providing a service to a terminal, the base station comprising:
    a transceiver; and
    a controller coupled with the transceiver and configured to:
        transmit, to the terminal, a configuration message for configuring a secondary cell in an unlicensed band,
        when a request for use of a second wireless communication system using the unlicensed band is identified and the terminal is detached from a network,
        transmit a user equipment (UE) capability information request message after the terminal is attached to the base station, and
        receive UE capability information including information that indicates the terminal does not support a licensed assisted access (LAA).

17. The base station of claim 16, wherein the request is identified when power of a wireless local area network (LAN) of the terminal has turned on, wireless LAN background scanning is performed, or the terminal moves to an area in which usability of the wireless LAN is high.

18. The base station of claim 17, wherein the area is determined based on at least one of global positioning system (GPS) information, a cell identifier, and a wireless LAN identifier.

19. The base station of claim 16, wherein the controller is further configured to receive a measurement report from the terminal.

20. The base station of claim 19, wherein the measurement report includes received signal strength less than a predetermined value.

* * * * *